Jan. 18, 1966 W. H. ROGERS ETAL 3,229,620
MACHINE FOR BONDING TOGETHER LAMINATED SHEETS
Filed Dec. 3, 1962 5 Sheets-Sheet 1
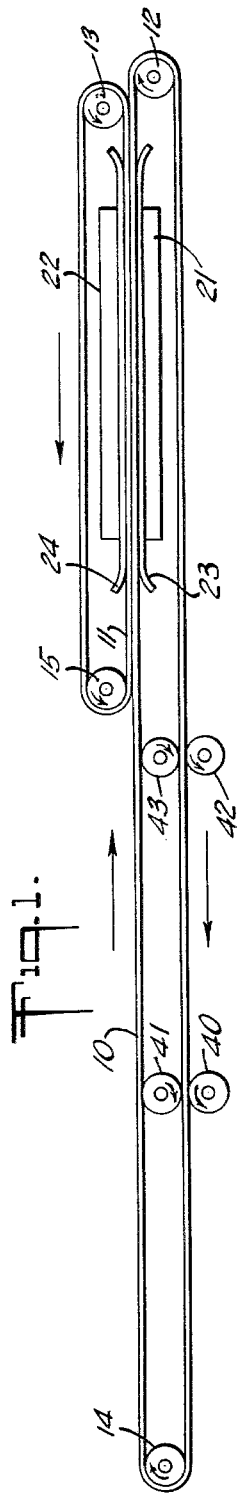
INVENTORS
WILLIAM H. ROGERS
GEORGE B. GILBERT
ALFRED G. GILBERT
JOSEPH V. DINARELLO
BY
Morrison, Kennedy & Campbell
ATTORNEYS.

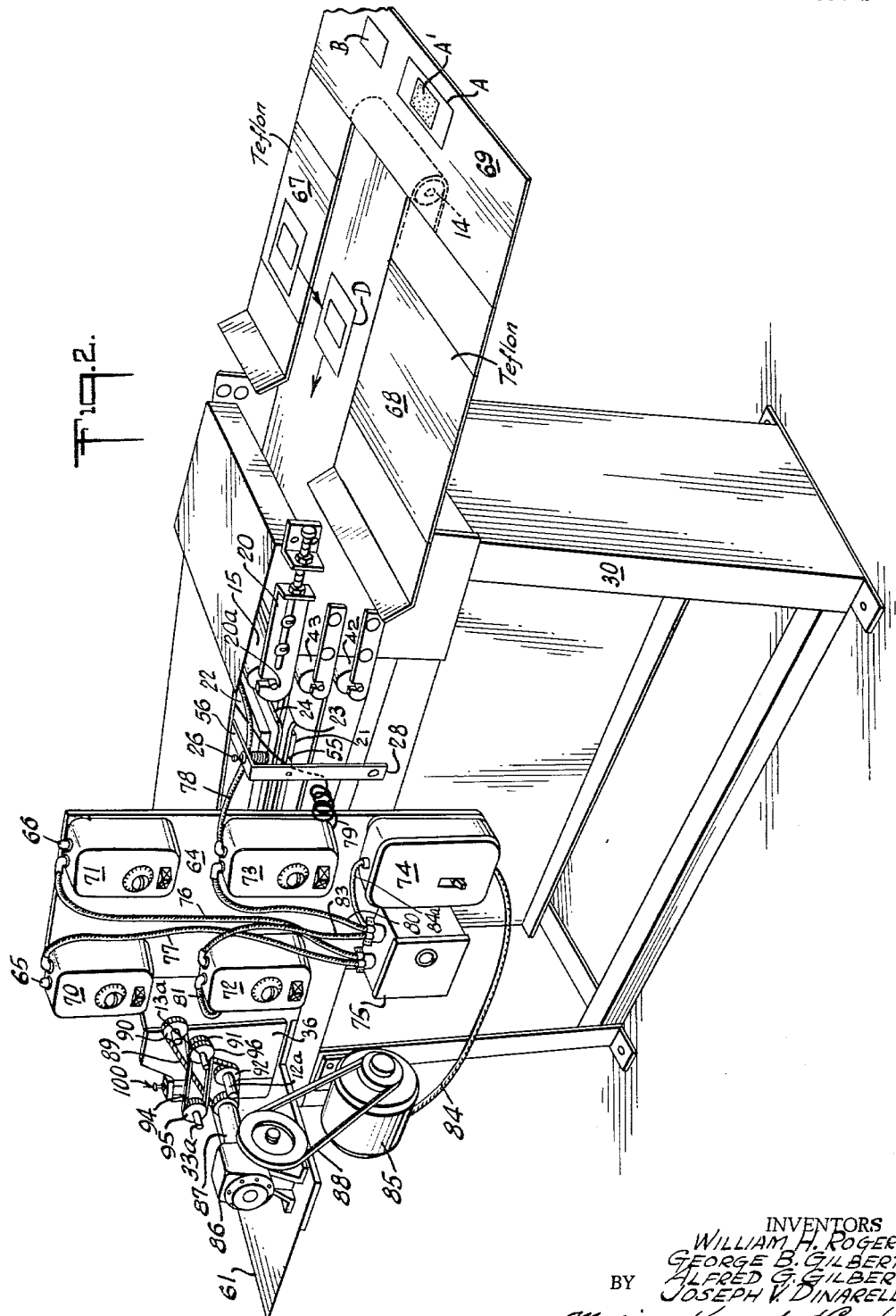

Jan. 18, 1966   W. H. ROGERS ETAL   3,229,620
MACHINE FOR BONDING TOGETHER LAMINATED SHEETS
Filed Dec. 3, 1962   5 Sheets-Sheet 5

INVENTORS
WILLIAM H. ROGERS
GEORGE B. GILBERT
BY ALFRED G. GILBERT
JOSEPH V. DINARELLO

Morrison, Kennedy & Campbell
ATTORNEYS.

Jan. 18, 1966  W. H. ROGERS ETAL  3,229,620
MACHINE FOR BONDING TOGETHER LAMINATED SHEETS
Filed Dec. 3, 1962  5 Sheets-Sheet 4
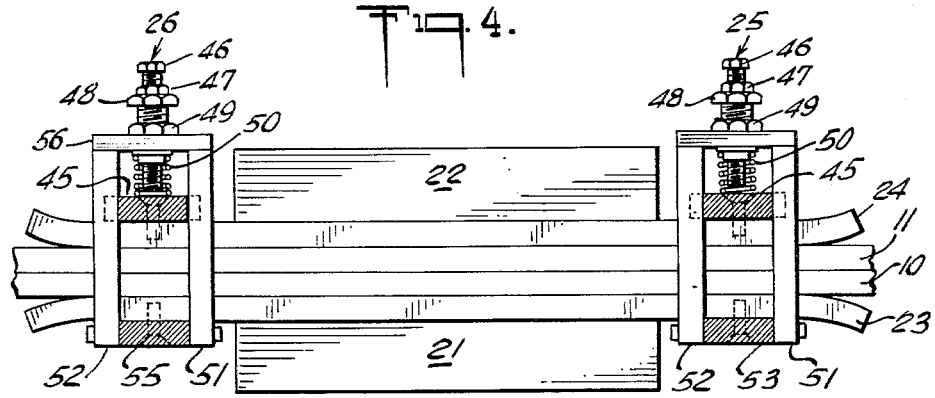
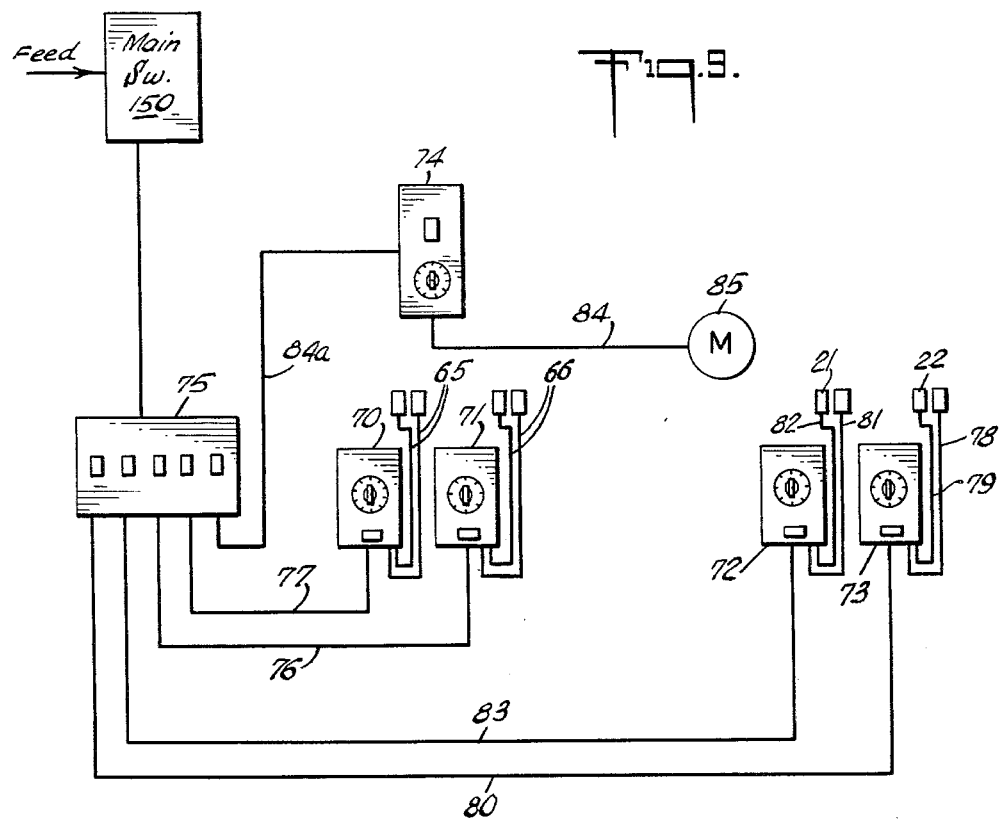
INVENTORS
WILLIAM H. ROGERS
GEORGE B. GILBERT
ALFRED G. GILBERT
JOSEPH V. DINARELLO
BY
Morrison, Kennedy & Campbell
ATTORNEYS

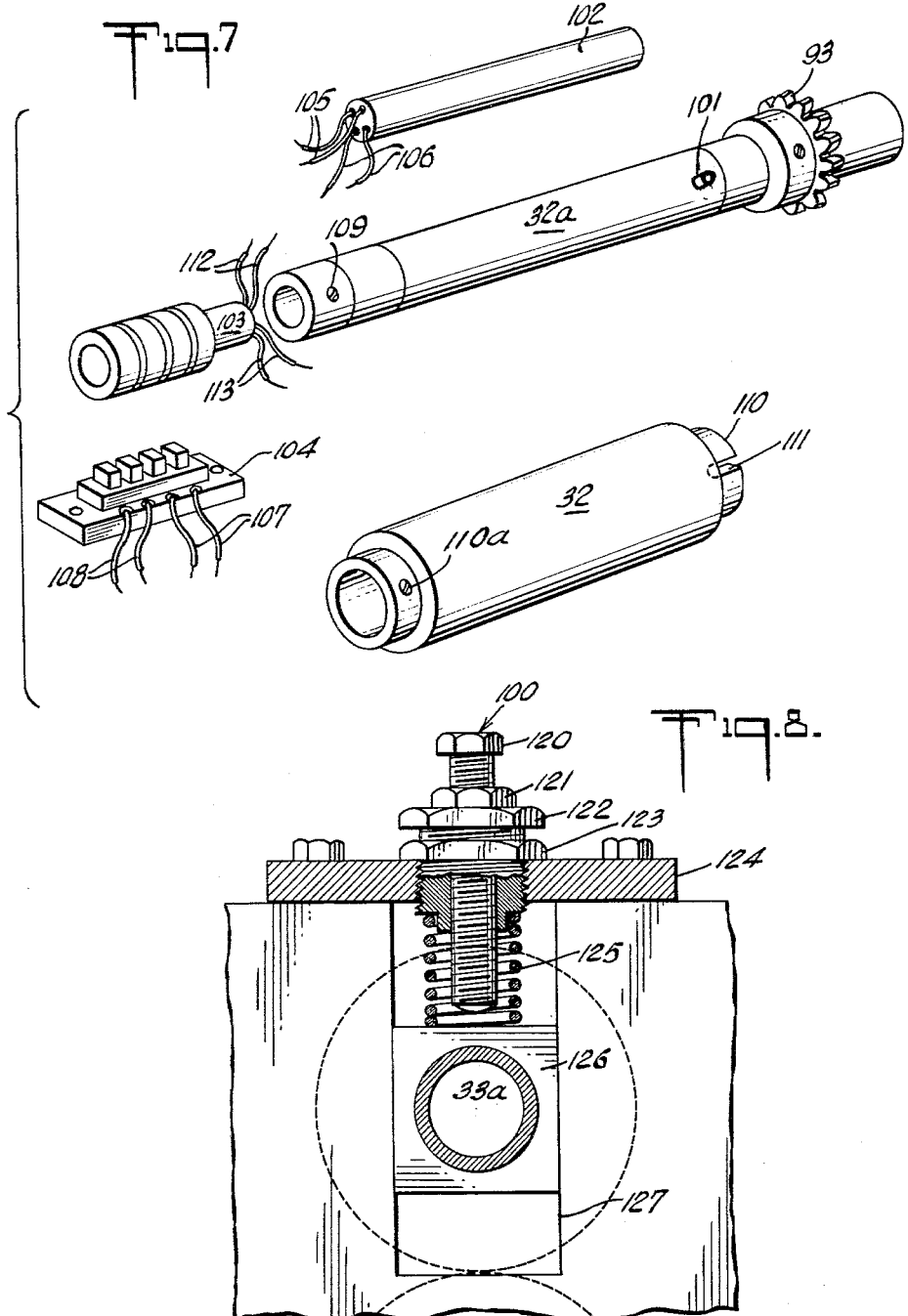

United States Patent Office 3,229,620
Patented Jan. 18, 1966

3,229,620
MACHINE FOR BONDING TOGETHER
LAMINATED SHEETS
William H. Rogers, Reading, Mass., George B. Gilbert, Hudson, N.H., and Alfred G. Gilbert, South Acton, and Joseph V. Dinarello, Melrose, Mass., assignors to Reece Folding Machine Company, a corporation of Maine
Filed Dec. 3, 1962, Ser. No. 241,672
9 Claims. (Cl. 100—93)

This invention relates broadly to machines for bonding together laminated sheets and more particularly to machines for continuously bonding, smoothing and/or embossing adhesively coated sheets under the influence of heat and pressure.

One of the objects of the invention is to provide a machine of such versatility as to allow it to bond a plurality of sheets into assemblies composed of a wide variety of materials which have been precoated in whole or in part.

Another object of the invention is to provide a machine which will allow the use of a wide variety of adhesive materials and still permit the lamination of the sheets into assemblies even to the extent of using different adhesive materials in the same assemblies for bonding purposes.

Another object of the invention is to provide a machine in which the heat and pressure producing mediums may be individually controlled over a wide range to allow for maximum versatility.

Still another object of the invention is to provide a machine having two separate and distinct bonding systems, each one individually controllable as to heat, speed and pressure.

Still another object of the invention is to provide a machine having extreme ease and versatility for preassembling and loading the precoated laminated sheets onto conveyor belts in continuous procession from one or more assembling tables. In addition, the machine may be further extended to include continuous belt loading and unloading.

A further object of the invention is to provide a machine which can also be adapted to bond a suitable plurality of strips which have been precoated with adhesive materials and which are fed into the machine from supply rolls to result in a laminated assembly that can be continuously wound onto a take-up roll at the egress end of the machine. Such strips may be in the form of labels, decals, etc. as desired.

More specifically, the invention is directed to a machine for bonding together laminated sheets comprising, in combination, a pair of continuously operated endless conveyor belts arranged one above the other in spaced relation to accept the laminated sheets between their adjacent stretches and carry them forward, a pair of elongated thermostatically controlled heaters for effecting the bonding of the laminated sheets as they are carried along by the conveyor belts, one of said heaters being arranged below the upper stretch of the lower belt and in contact with the lower face thereof, and the other of said heaters being arranged above the lower stretch of the upper belt and in contact with the upper face thereof, one of said heaters and one of said conveyor belts being yieldably mounted with reference to its mate to accommodate laminated sheets of different thicknesses as well as to apply bonding pressure thereto, a pair of pressure rolls one of which is yieldably mounted with reference to the other and both of which are heated under thermostatic control and arranged at and beyond the egress end of the conveyor belts to receive the laminated sheets and complete the bonding thereof and impart to them their final finish, means for driving the endless conveyor belts and pressure rolls at a speed related to the temperature developed by the heaters and necessary to bond the laminated sheets, means at the ingress end upon which the laminated sheets are assembled and fed onto an extended portion of the lower conveyor belt, and means at the egress end for marking, tagging and packaging the finished assemblies.

One of the features of the invention is the provision of a system of drives and suspensions which will readily allow the adjustment and changing of each of the conveyor belts without disturbing the other and each of the pressure rolls without disturbing the other.

Other and further features of the invention reside in the improved structural arrangement coupled together with the ready arrangements of the units to provide easy accessibility and changeability.

The above and other objects will be made clear from the following detailed description taken in connection with the annexed drawings in which a preferred embodiment of the invention is shown by way of an example, wherein:

FIG. 1 is a phantom side view showing the arrangement of the pair of continuously operated conveyor belts and the elongated heaters located above and below the contacting faces of the belts for bonding the laminated sheets together;

FIG. 2 is a perspective view of the right side of the complete machine with the belt and heater arrangement shown in FIG. 1 illustrating the presure roll and conveyor drive means as well as the switches and thermostats for controlling the temperature of the pressure rolls and elongated heaters;

FIG. 3 is a perspective view of the left side of the complete machine shown in FIG. 2, showing the assembling tables arranged at the ingress end and the work table at the egress end;

FIG. 4 is an enlarged side view of the mounting and pressure controlling means for the elongated heaters;

FIG. 6 is a front view of the pressure roll and conveyor belt drive means shown in FIG. 5, with the reduction gear removed;

FIG. 7 is a perspective view of the pressure roll hollow shafts with the drive sprocket and associated equipment;

FIG. 8 is a side view of the pressure roll control means; and

FIG. 9 is a wiring diagram of the electrical control system.

Figure 5:
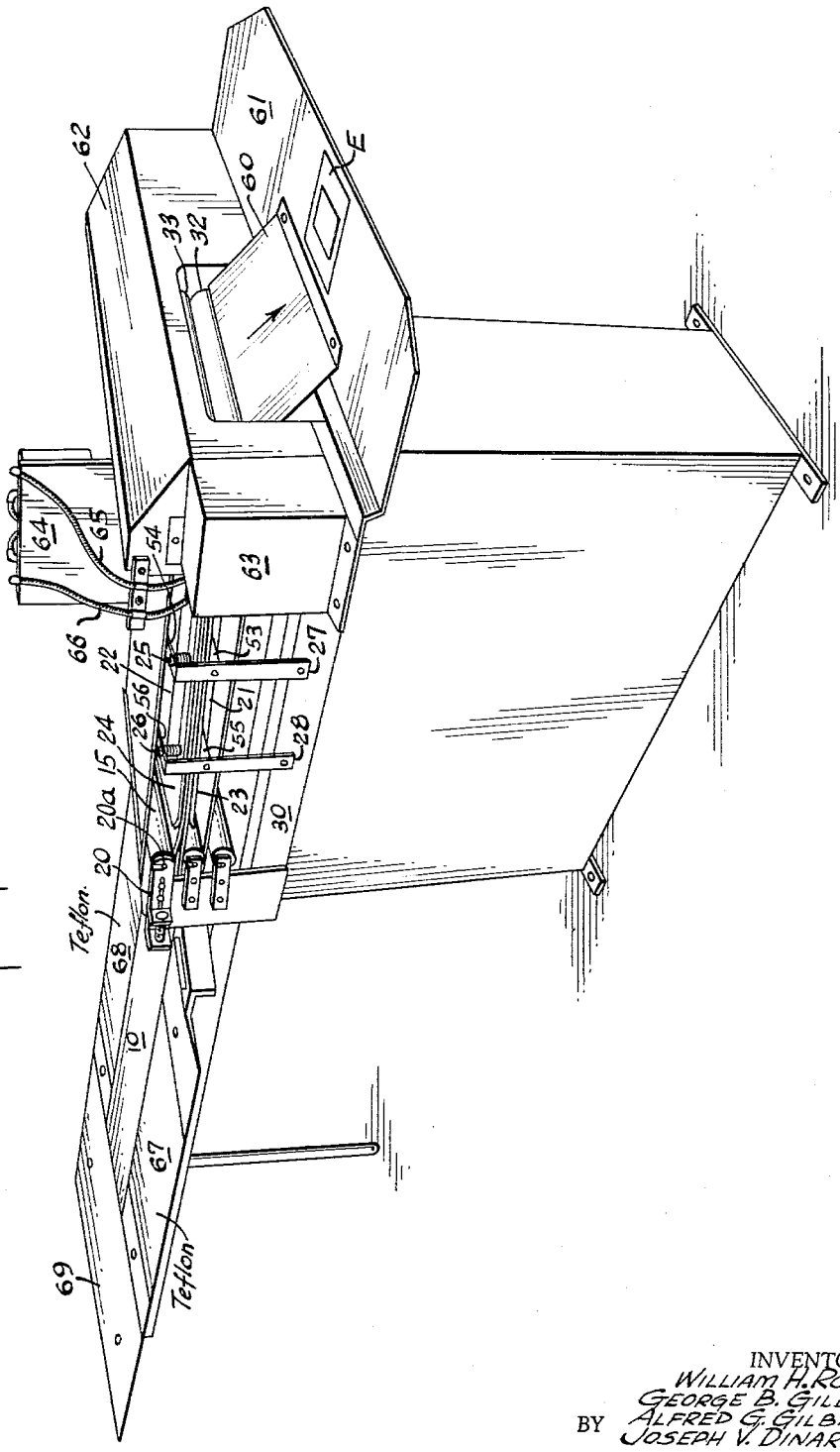
FIG. 5 is an enlarged side view of the pressure roll and conveyor belt drive means.

FIG. 1 is a phantom view showing the arrangement of a pair of continuously operated endless conveyor belts 10 and 11 composed of suitable material able to withstand and transmit the bonding temperatures employed. These belts are supported by drive rolls 12 and 13 at one end and by guide and tensioning rolls 14 and 15 at the other end, the belts being arranged one above the other in spaced relation to accept laminated sheets between their adjacent stretches. The drive rolls 12 and 13 are so positioned as to allow for the passage therebetween of various thicknesses of laminated sheets and still exert pressure thereon, while the guide and tensioning rolls 14 and 15 are mounted in suitable tensioning and adjusting devices to allow for tensioning and guiding the stretches of the upper and lower conveyor belts and also to provide for parallelinity of the belt stretches. At the entrance or ingress end, the lower conveyor belt 10 is extended to provide a plurality of assembling positions for the laminated sheets, and this belt is also provided with a plurality of support rolls 40, 41, 42 and 43 necessary to provide a substantially flat stretch upon which the laminated sheets are fed between the two conveyor belts. It will be noted that the support rolls 42 and 43 are slightly displaced ahead of the tensioning and guiding roll 15 for the upper belt 11, this to allow for the entrance of various thicknesses of laminated sheets into and between the two continuously operated conveyor belts.

The adjacent stretches of the two conveyor belts 10 and 11 are contacted on their back faces by a pair of elongated thermostatically controlled heaters 21 and 22 equipped with belt pressing and guiding shoes 23 and 24 to allow the application of suitable heat and pressure to the stretches of the belts and thus bond the laminated sheets together. The pressure producing means for the two elongated heaters will later be described.

FIG. 2 is a perspective view of the right side of the complete machine as equipped with the belt and heater arrangement shown in FIG. 1. The guide and tensioning rolls 14 and 15 are mounted in suitable tensioning devices on both sides of the machine, these devices, as shown at 20, being slidably positioned by means of bolts in well known manner. The shafts of the rolls 14 and 15 are readily demountable from the tensioning devices, which for that purpose are formed with deep slots 20a, these slots also allowing vertical displacement of the rolls when necessary to accommodate thick groups of laminated sheets.

The machine is formed at the ingress end with assembling tables 67 and 68 extended inwardly over and above the belt 10. The surfaces of the tables are covered with a suitable frictionless material, such as Teflon, upon which the laminated sheets may be assembled and from which they may be pushed onto the belt 10 without disturbing the assemblies. In addition, the assembling tables are connected across the end of the machine by a stacking table 69 for the individual sheets to be laminated. It is obvious that the lower belt 10 may be made long enough to provide any number of assembling positions on one side or on both sides as may be deemed necessary for the production required. It is also possible to feed the laminated assemblies into the machine from continuous conveyor belts.

The machine is equipped with a variable speed drive for driving the endless conveyor belts at a speed related to the temperature developed by the heaters and necessary to initially bond the laminated sheets. Such a variable speed drive consists of a variable speed motor 85 controlled by a switch and speed control unit 74 driving a reduction gear unit 86 by means of a V-belt 88 with the output of the drive coupled via coupling 87 to the drive shaft 32a of the lower pressure roll 32. As shown in FIGS. 5 and 6, said roll drive shaft 32a has a sprocket wheel 93 mounted and locked thereon and which drives the lower conveyor belt drive roll shaft 12a by means of sprocket wheel 92, the upper conveyor belt drive roll shaft 13a by means of sprocket wheel 91, idler sprocket wheel 90 (slidably mounted on the machine side plate 36) and chain 89, whereby all of these rolls are driven in unison. The shaft 33a of the upper pressure roll 33 is driven by means of sprocket wheel 96 mounted on the upper conveyor belt drive roll shaft 13a (already containing sprocket wheel 91) and which drives sprocket wheel 95 thereon by means of chain 94. This drive arrangement allows for the resilient mounting and movement of the upper pressure roll 33 and if desired a similar mounting may be provided for the lower pressure roll 32. It will thus be seen that, if all the sprockets are of the same diameter and number of teeth, the pressure rolls and the conveyor belt drive will all be driven at the same peripheral speed. In certain instances, it may be desired to drive the pressure rolls at a slightly higher speed than the conveyor belt drive rolls, in which case the sprocket wheels 93 and 95 are changed to a suitable size and number of teeth to accomplish the desired revolutions per minute.

The electrical control panel 64 is arranged to contain all of the control equipment necessary to make the machine completely automatic with the exception of the in-feeding of the laminated sheets. The two top control units 70 and 71 are used to control the temperatures of the two pressure rolls 32 and 33 and consist of embedded temperature detector contained in the rolls and controlling the temperature of said rolls by means of adjustable thermostats which cause heaters contained inside the rolls to be energized and thus keep the temperature of the rolls at a mean temperature to complete the bonding of the laminated sheets and impart to them their final finish. The two center control units 72 and 73 are used to control the temperatures of the elongated heaters 21 and 22 and consist of temperature sensing elements which control the mean temperature of said elongated heaters. These center control units are continuously adjustable over a given temperature range to furnish the means for controlling the heat necessary to activate the adhesives and effect the initial bonding of the laminated sheets. The bottom control unit 74 is used to control the speed of the variable speed drive motor 84. The unit 75 is used to house five independent circuit breakers of suitable rating to individually control and protect the individual circuits fed directly from a main switch or circuit breaker.

The pressure applied to the two elongated heaters is furnished by two spring loaded adjustable pressure devices 25 and 26 arranged on one side of the machine in one end of frames 27 and 28 rising from the bed 30, as shown in FIG. 3, and two similar devices arranged at the opposite side of the machine and likewise mounted in the opposite end of the frames 27 and 28. This spring mounting is shown in greater detail in FIG. 4, which is an enlarged side view with the two vertical side portions of the frames 27 and 28 removed to more clearly show the devices. The two pairs of pressure controlling means 25 and 26, arranged on opposite sides of the elongated heater assemblies, are exact duplicates and only one need be described.

The frame 27 has two vertical legs (not shown in FIG. 4) with two cross members 53 and 54 having fastened thereto two vertical spacing and guide members 51 and 52, located outboard of the elongated heaters 21 and 22, for locating said heaters above and below the adjacent stretches of the belts. The bottom cross member 53 has the bottom belt pressing and guiding shoe 23 removably fastened thereto, while a cross guide member 45 has the top belt pressing and guiding shoe 24 removably fastened thereto. Said member 45 has extensions at both ends to thus form with the two vertical spacing and guide members 51 and 52 a guide means for vertical movement of the shoe 24 with the top heater 22 permanently fastened thereto. The top cross member 54 is arranged with two sets of pressure adjusting means at its opposite ends, one of which (25) consists of a stud 46 (and lock nut 47 therefor) arranged to screw down and positively lock the cross guide member 45 from moving upwardly beyond a given point and thus form a positive pressure producing means for the heater 22, and the other of which consists of a hollow stud 48 (and lock nut 49 therefor) arranged directly in the top cross member 54 and adjustable to compress a spring 50 which bears down upon the shoe 24 to produce a yielding pressure for the heater 22. It is obvious that the two pressure means may be used in unison to produce a yielding pressure up to a given point and then have the positive pressure take over, thus giving a wide variation of pressures for a wide variety of adhesives or materials used in the laminated sheet assemblies.. It is also obvious that if very thin laminated sheet assemblies are to be bonded, a single frame with two pressure means, one on each side, may be used as above described. As an additional feature, if long springs are to be used, they may be retained in place by dapping the cross guide member 45 to receive the lower ends of the springs and thus secure them in place.

It will now be seen that the two elongated heaters 21 and 22 with their belt pressing and guiding shoes 23 and 24 will normally have two sets of vertical guiding means on each side and four associated positive or yielding pressure devices. For extremely wide conveyor belts, six sets of pressure devices may be resorted to in order to get even pressure. If very thick laminated sheet assemblies are to be bonded, the bottom elongated heater 21 may be yieldably mounted with reference to the top heater 22 by duplicating in reverse the top pressure means 25. The belt pressing and guiding shoes 23 and 24 may be made in either of two ways, depending upon the thickness of the shoes, i.e., by turning up the ends of thin shoes (as shown) or by rounding the ends of thicker shoes. The thickness of the shoes will depend upon the temperatures desired and the rate of heat flow necessary to activate the adhesives being used for bonding.

FIG. 7 is a perspective view of the hollow shaft 32a of the pressure roll 32 with the drive sprocket 93 on one end and the heater 102 and commutator 103 for insertion into the hollow shaft at the opposite end. The pressure roll 32 is fitted removably on the hollow shaft 32a and is driven by means of a pin 101 arranged in a slot 111 formed in the steel sleeve 110 of the roll. A set screw 110a locks the roll sleeve on the shaft 32a. The pressure roll 33 is a duplicate of the roll 32 and is removably mounted on a hollow shaft 33a which is a duplicate of shaft 32a. The reference numerals for the remaining elements are applied to both rolls. The two rolls may be formed of any suitable material (metal, rubber or plastic) and may, if desired, be metal embossing rolls. It will now be seen that the shafts 32a and 33a, with their respective rolls thereon, may readily be removed from the machine and the rolls changed upon the shafts to adapt the machine for any and all types of assemblies regardless of adhesives or finishes.

The hollow shafts, open at one end, readily receive cartridges 102 which contain heaters and temperature detectors whose leads 105 and 106 are connected to two pairs of leads 112 and 113 of commutators 103, which latter are arranged to fit into the hollow shafts and be locked in place therein by means of set screws 109. The commutators 103, with their two sets of rings, are then contacted by brush holder blocks 104 which are arranged to contact the commutator rings and carry the current to the heaters and the thermostats, thus furnishing a means for heating and controlling the temperature of the pressure rolls. The brush holder blocks 104 are supported on the base of the machine and are arranged to wipe the commutator rings. The whole end of the machine is covered by a housing 63, as shown in FIG. 3, with the two pairs of leads 65 and 66 going to the temperature control units 70 and 71. This heater arrangement, in conjunction with the removable sleeve pressure rolls, gives the machine an extreme flexibility to handle a wide variety of laminated sheets coated with many different types of adhesives and in addition enables the rolls to impart any finish desired to the outside of the laminated sheet assemblies.

In FIG. 8 is shown a side view of one of a pair of pressure control means 100 for the pressure roll hollow shafts. The bottom pressure roll 32 is mounted directly in fixed bearings in the machine, while the upper pressure roll 33 is yieldably mounted by means of bearing block 126 journaled to receive the end of the shaft 33a and slidably mounted in a guideway 127 contained in the machine. The shaft is centered and held in place at one end by means of the collar on the sprocket wheel 93 which contacts the outboard side of the vertical frame member and by means of another but similar collar on the end of the roller sleeve 110 which contacts the inboard side of said frame member. The positive and yielding pressure exerting means is the same as is used for the elongated heaters and may be briefly described as follows: A stud 120 is adjusted to any vertical position and locked therein by a lock nut 121 to furnish the positive pressure, while a hollow stud 122, threaded into a mounting strap 124 and locked thereon by a lock nut 123, furnishes the yielding pressure exerted by way of spring 125. Here again the bearing block 126 may be dapped to retain springs 125 therein when long springs are used.

Reference is now made to FIG. 9, which shows a wiring diagram of the electrical control system used in the machine. A main switch 150 is used to energize the entire control circuit and feeds the five small suitably rated circuit breakers contained in the housing 75. The motor control unit 74 is equipped with a speed varying device on its cover and thus forms the means for varying the speed of the motor 85 and correspondingly varying the speed of the endless conveyor belts and drive them at a speed related to the temperature developed by the heaters to activate the adhesive and bond the laminated sheets into an assembly. The two pressure roll temperature control units 70 and 71 are energized by means of the two circuit breakers contained in the housing 75 and are equipped with separate temperature controls on their faces by means of which the roll temperatures necessary to activate the adhesive and give the final finish can be varied as desired. The embedded temperature controls located in the hollow shafts of the pressure rolls with the heaters, and connected to the control units by means of cables 65 and 66, are thus operative continuously to control and furnish the necessary heat to complete the bonding of the laminated sheets. The two elongated heaters 21 and 22 used to heat the stretches of the belts 10 and 11 are similarly controlled by means of control units 72 and 73 with connecting cables 78, 79, 81 and 82 to thus vary and thermostatically control the two separate individual heaters and furnish the right amount of heat to perform the initial bonding of the laminated sheets.

It is readily apparent from the foregoing disclosure that a new and widely diversified machine is herein disclosed for taking laminated sheets and continuously bonding them into suitable assemblies by means of heat and pressure. The instant machine was conceived and designed to accommodate an extremely wide variety of products such as are manufactured in various trades, for instance the book cover trade, shoe trade, handbag trade, luggage trade, wallet trade and many other trades involving the manufacture of articles composed of laminated sheet materials. Five classes of work may be specificallly mentioned:

(1) The lamination of sheets by the use of simple adhesives
(2) The lamination of sheets precoated with thermoactive adhesives
(3) The lamination of sheets precoated with pressure-sensitive adhesives
(4) The lamination of sheets which involves the vulcanization of uncured rubber or plastic material
(5) The lamination and finishing, including embossing, of various materials under the influence of heat and pressure.

Since the products may vary so widely, a simple diagrammatic illustration is given in FIG. 2 wherein are B of different sizes to be laminated and bonded. The larger sheet A has an adhesive coating $A^1$ centrally located and of the same area as the smaller sheet B. These two sheeets are shown in assembled laminated relation at station C on the assembly table 67 from which the laminated assembly is slid by the operator onto the conveyor belt 10 as shown at D. After passing through the machine the laminatted sheet assembly, in bonded and finished condition, emerges from the pressure rolls and is deposited at E on the work table 61 (see FIG. 3).

While the machine herein shown has been designed for handling individual assemblies of laminated sheets which are fed into the machine one after another and which emerge from the machine in the same manner, nevertheless the invention contemplates fusing, heat sealing, embossing and similar operations where the work is supplied continuously to the machine. Thus in one type of continuous feed, the laminated sheets are drawn from supply rolls and fed through the machine for bonding and taken out of the machine as a bonded laminated unit and wound onto a take-up roll. Another type of continuous feed would include the application of labels, decals or similar items upon strip material as it is fed into and through the machine and subjected to the heat and pressure treatment.

It will now be understood why the machine as hereinbefore described is provided with two bonding units, one of which (the elongated heaters) performs the initial bonding operation, and the other of which (the pressure rolls) completes the bonding operation as well as imparts to the final product the desired finish, whether smooth or embossed. By controlling the heat and pressure of the two bonding units, it is possible to adapt the machine to the various classes of work mentioned above without materially altering the basic machine elements.

This application is a continuation in part of copending application Serial No. 136,930, filed September 8, 1961, now Patent No. 3,128,484. The machine disclosed in this parent application was especially designed for the manufacture of flexible book covers composed of leather or plastic material with adhesively attached liners composed of paper, cardboard, or similar material. The heat sealing and smoothing unit disclosed in that application is arranged to act upon the book covers after the two components have been preliminarily bonded together during the folding operation. In the instant application, the heat sealing and smoothing unit of the earlier application has been modified to act as an individual unit and thus is capable of use with many different types of material and for the production of many different types of finished products. The machine of the instant application is truly a universal machine and is suitable for use in many different trades in contrast to earlier types of machines which for the most part were confined in their use to a particular trade and for one class of work. It is to be emphasized that the new machine operates on a continuous principle, thus eliminating the delays which occur in other machines operating on an intermittent principle.

What is claimed is:

1. A machine for bonding together laminated sheets in the form of individual assemblies comprising, in combination,
   (a) a pair of continuously operated endless conveyor belts arranged one above the other in spaced relation to accept a continuous stream of individual assemblies of laminated sheets between their adjacent stretches and carry them forward through the machine, said belts being dimensioned to contact said laminated sheet assemblies throughout the entire area of their top and bottom surfaces,
   (b) a pair of elongated thermostatically controlled heaters for effecting the bonding of the laminated sheets of the individual assemblies as they are carried along by the conveyor belts, one of said heaters being arranged below the upper stretch of the lower belt and presenting a flat continuous surface in contact with the lower face thereof, and the other of said heaters being arranged above the lower stretch of the upper belt and presenting a flat continuous surface in contact with the upper face thereof,
   (c) and both of said belts being of uniform thickness and thus capable of transmitting substantially uniform heat and substantially uniform pressure from the heaters to the laminated sheet assemblies between the belts,
   (d) means for varying the temperature developed by the heaters according to the heat requirements of the laminated sheet assemblies being operated upon,
   (e) means for mounting one of said heaters for resilient movement toward and from the other heater to accommodate laminated sheet assemblies of different thicknesses as well as to apply a substantially uniform bonding pressure thereto,
   (f) means for driving the endless conveyor belts at variable speeds related to different temperatures developed by the heaters and necessary to bond the laminated sheet assemblies,
   (g) a pair of continuously driven pressure rolls heated under thermostatic control and arranged at but beyond the egress end of the conveyor belts to receive the individual assemblies of laminated sheets therefrom and apply a further bonding pressure thereto said pressure rolls being dimensioned to contact said laminated sheet assemblies throughout the entire area of their top and bottom surfaces,
   (h) means for mounting one of said pressure rolls for resilient movement toward and from the other pressure roll to accommodate laminated sheet assemblies of different thicknesses as well as to apply a substantially uniform bonding pressure thereto,
   (i) means for varying the temperature developed by the pressure rolls according to the heat requirements of the laminated sheet assemblies being operated upon, and
   (j) means for driving the pressure rolls at variable speeds related to different temperatures developed by said rolls and necessary to complete the further bonding of the laminated sheet assemblies.

2. The combination according to claim 1, including means for mounting one of the conveyor belts for resilient bodily movement toward and from the other conveyor belt to accommodate laminated sheet assemblies of different thicknesses as well as to apply bonding pressure thereto.

3. The combination according to claim 1, wherein the mounting means for the movable heater as well as the mounting means for the movable pressure roll each include and adjustable stop which positively arrest the outward or separating movement of said heater or said pressure roll to vary the pressure for the bonding of the laminated sheet assemblies.

4. The combination according to claim 1 wherein the pressure roll shafts are provided with removable sleeve rolls to facilitate the changing and replacing of the rolls and thus allow the use of resilient, hard or embossing rolls or suitable combinations thereof for the final bonding of the laminated sheet assemblies.

5. The combination according to claim 1, wherein the lower conveyor belt is extended beyond the upper conveyor belt at the ingress end to provide a plurality of loading positions for the individual assemblies of laminated sheets.

6. The combination according to claim 5, wherein the machine is equipped with one or more assembling tables on either side of the extended portion of said lower belt, said assembling table or tables being above and extending shown on work table 69 two sheets of material A and inwardly over the outboard edge of said extended belt portion.

7. The combination according to claim 6 wherein the assembling tables are provided with frictionless areas on which the laminated sheets are assembled and then moved over onto the conveyor belt without disrupting the assemblies.

8. The combination according to claim 1 wherein the speed of the conveyor belts and pressure rolls is controlled by means of a common variable speed drive.

9. The combination according to claim 1, including means for shielding the conveyor belts and the pressure rolls against heat radiation.

References Cited by the Examiner

UNITED STATES PATENTS

| | | | |
|---|---|---|---|
| 2,107,249 | 2/1938 | Hepke | 156—583 |
| 2,126,908 | 8/1938 | Moore | 156—583 |
| 2,441,940 | 5/1948 | Rohdin | 156—583 |
| 2,469,972 | 5/1949 | Lowry et al. | 156—581 |
| 2,542,901 | 2/1951 | Chaffee | 156—583 |
| 2,680,470 | 6/1954 | Stanton | 156—582 |
| 3,067,309 | 12/1962 | Chinn | 156—380 |

EARL M. BERGERT, *Primary Examiner.*

DOUGLAS DRUMMOND, *Examiner.*